(12) United States Patent
Wang et al.

(10) Patent No.: US 12,360,766 B2
(45) Date of Patent: Jul. 15, 2025

(54) HARDWARE ACCELERATOR FOR EXECUTION OF INSTRUCTION SET OF RECURRENT NEURAL NETWORK, DATA PROCESSING METHOD, SYSTEM-LEVEL CHIP, AND MEDIUM THEREOF

(71) Applicant: DapuStor Corporation, Shenzhen (CN)

(72) Inventors: Yan Wang, Shenzhen (CN); Yunxin Huang, Shenzhen (CN); Jixing Zhang, Shenzhen (CN); Weijun Li, Shenzhen (CN)

(73) Assignee: DAPUSTOR CORPORATION, Shenzhen (CN)

( * ) Notice: Subject to any disclaimer, the term of this patent is extended or adjusted under 35 U.S.C. 154(b) by 54 days.

(21) Appl. No.: 18/201,755

(22) Filed: May 24, 2023

(65) Prior Publication Data

US 2023/0297375 A1  Sep. 21, 2023

Related U.S. Application Data

(63) Continuation of application No. PCT/CN2021/118470, filed on Sep. 15, 2021.

(30) Foreign Application Priority Data

Dec. 31, 2020 (CN) .......................... 202011641233.1

(51) Int. Cl.
*G06F 9/30* (2018.01)
*G06F 9/28* (2006.01)
(Continued)

(52) U.S. Cl.
CPC ........ *G06F 9/3005* (2013.01); *G06F 9/30036* (2013.01); *G06N 3/044* (2023.01)

(58) Field of Classification Search
CPC ............... G06F 9/3005; G06F 9/30036; G06F 9/30014; G06F 9/30032; G06F 9/30043;
(Continued)

(56) References Cited

U.S. PATENT DOCUMENTS

2019/0340493 A1  11/2019 Coenen et al.
2020/0167158 A1  5/2020 Cassidy et al.
(Continued)

FOREIGN PATENT DOCUMENTS

CN    107341542 A    11/2017
CN    109086875 A    12/2018
(Continued)

OTHER PUBLICATIONS

International Search Report issued in corresponding International Application No. PCT/CN2021/118470, mailed Dec. 15, 2021, 6 pages.

*Primary Examiner* — Shawn Doman
(74) *Attorney, Agent, or Firm* — BAYES PLLC

(57) ABSTRACT

A hardware accelerator for running an instruction set of a recurrent neural network, a data processing method, a system-level chip, and a medium are provided. The hardware accelerator is configured to process the instruction set. The instruction set includes: a data flow control instruction used for performing data flow control; a general-type computing instruction used for performing general-type computation to implement general-type computation in the recurrent neural network; a special-type computing instruction used for performing special-type computation to implement special-type computation in the recurrent neural network; an exponential shift instruction used for performing exponential shifting to implement data normalization during computation of the recurrent neural network; and a data transfer instruction used for performing data transfer to implement data transfer operations between different registers as well as data transfer (Continued)

operations between registers and memories during computation of the recurrent neural network.

20 Claims, 9 Drawing Sheets

(51) Int. Cl.
    *G06F 9/38*     (2018.01)
    *G06N 3/044*     (2023.01)
    *G06N 3/0442*     (2023.01)
    *G06N 3/045*     (2023.01)
    *G06N 3/048*     (2023.01)
    *G06N 3/06*     (2006.01)
    *G06N 3/063*     (2023.01)

(58) Field of Classification Search
    CPC ............ G06F 9/30065; G06F 9/30109; G06F 9/3877; G06F 9/28; G06F 9/30098; G06N 3/044; G06N 3/0442; G06N 3/048; G06N 3/063; G06N 3/06; G06N 3/045; Y02D 10/00

See application file for complete search history.

(56) References Cited

U.S. PATENT DOCUMENTS

2021/0182077 A1\*   6/2021   Chen .................. G06Q 30/0241
2022/0327840 A1\*  10/2022   Ambeck-Madsen ........................
                                                                      B60W 40/04

FOREIGN PATENT DOCUMENTS

| CN | 110516789 A | 11/2019 |
| --- | --- | --- |
| CN | 111931918 A | 11/2020 |
| CN | 112784970 A | 5/2021 |

\* cited by examiner

HARDWARE ACCELERATOR FOR EXECUTION OF INSTRUCTION SET OF RECURRENT NEURAL NETWORK, DATA PROCESSING METHOD, SYSTEM-LEVEL CHIP, AND MEDIUM THEREOF

CROSS-REFERENCE TO RELATED APPLICATIONS

This application is a continuation of International Application No. PCT/CN2021/118470, filed on Sep. 15, 2021, which claims the benefit of priority to Chinese Patent Application No. 202011641233.1, filed on Dec. 31, 2020. The entire contents of each of the above-referenced applications are expressly incorporated herein by references.

TECHNICAL FIELD

The present application relates to the technical field of artificial intelligence, in particular to a hardware accelerator, a data processing method, a system-level chip, and a medium.

BACKGROUND

At present, hardware accelerators for neural networks include Google's TPU, NVDIA's NVDLA, Cambricon and so on. Mainstream neural network hardware accelerators have done a lot of computational optimizations for Convolutional Neural Networks (CNNs) and Recurrent Neural Networks (RNNs), and targeted optimization has been made for convolution and convolutional computations of convolution kernels of different sizes in the process of hardware computation.

In the prior art, there are no relevant methods or technologies that are specifically designed for RNNs and require high throughput and real-time reasoning. The prior art mainly focuses on methods, processes, and hardware architecture integrating RNNs and CNNs. Due to the fact that the existing RNNs and CNNs hardware accelerators are universal, they are difficult to be applied to computations specifically for CNNs, and have the following drawbacks:
1. Due to the need to consider a large number of CNNs and other computation applications, the utilization of computing resources is not high;
2. There are many spliced data in the processes of the prior art, but data splicing needs not to be considered in methods and processes optimized separately for RNN;
3. There is a dependency relationship between the data of the preceding and following instructions, the data dependency relationship is judged by a special module to determine whether a pipeline is stopped or running, and the methods and processes cannot achieve high utilization of computing resources; and
4. Some existing methods and architectures require software scheduling to balance resources and reclaim hardware resources. Failure to plan instructions often leads to data conflicts (the required data has not yet been computed, but instructions have been properly arranged) and resource conflicts (each instruction has a complete set of computing resources distributed throughout the pipeline), resulting in low computational efficiency.

SUMMARY

In view of this, the objective of the present application is to provide a hardware accelerator for running an instruction set of a recurrent neural network, a data processing method, a system-level chip, and a storage medium, which can effectively improve the utilization of computing resources of a hardware accelerator for running a recurrent neural network, and can effectively avoid conflicts in data and resources.

In a first aspect, this application discloses a hardware accelerator for running an instruction set of a recurrent neural network. The hardware accelerator is configured to process the instruction set, and the instruction set includes:
  a data flow control instruction, used for performing data flow control to control data at the input and output ends of a computing pipeline in the recurrent neural network;
  a general-type computing instruction, used for performing general-type computation to implement general-type computation in the recurrent neural network, where an expression for the general-type computation is $\theta(w*x+b)$, $\theta$ represents a sigmoid activation function or tan h activation function, w represents a weight vector, x represents a data vector, and b represents a bias parameter;
  a special-type computing instruction, used for performing special-type computation to implement special-type computation in the recurrent neural network, where an expression for the special-type computation is $(f_t \odot c_{t-1} + i_t \odot \tilde{c}_t)$ and extended operation thereof, $i_t$ represents an input gate, $\tilde{c}_t$ represents a state gate, $f_t$ represents a forget gate, $c_{t-1}$ represents the previous piece of state data, and $\odot$ represents a Hadamard product;
  an exponential shift instruction, used for performing exponential shifting to implement data normalization during computation of the recurrent neural network; and
  a data transfer instruction, used for performing data transfer to implement data transfer operations between different registers as well as data transfer operations between registers and memories during computation of the recurrent neural network.

In some embodiments, a memory arranged in the hardware accelerator includes:
  an input vector memory, configured to store input vectors to be computed;
  a weight vector memory, configured to store weight vectors of the recurrent neural network;
  a bias parameter memory, configured to store bias parameters of the recurrent neural network;
  a universal intermediate data memory, configured to store intermediate data generated during the running of the recurrent neural network; and
  an output result memory, configured to store output results of the recurrent neural network.

In some embodiments, the data flow control instruction includes:
  a first sub-instruction, used for performing input control to control the input to the computing pipeline in the recurrent neural network through the state of the input vector memory;
  a second sub-instruction, used for performing output control to control the output from the computing pipeline in the recurrent neural network through the state of the output result memory; and
  a third sub-instruction, used for performing running control to control the running of the computing pipeline in the recurrent neural network.

In some embodiments, the general-type computing instruction includes:
- a first parameter extraction unit, configured to extract a vector operand address, a bias parameter address, an activation operation control code, and a post-processing operation control code from the general-type computing instruction;
- a first data reading unit, configured to read the weight vector and the data vector corresponding to the vector operand address, and read the bias parameter corresponding to the bias parameter address from related registers or memories;
- a first computing unit, configured to compute a dot product of the weight vector and the data vector, and add the dot product to the bias parameter to obtain a corresponding vector computing result;
- a second computing unit, configured to implement an activation function corresponding to the vector computing result in the general-type computational process under the control of the activation control code, and obtain the corresponding activation function operation result; and
- a third computing unit, configured to implement post-processing operations corresponding to the activation function operation result in the general-type computational process under the control of the post-processing operation control code.

In some embodiments, the special-type computing instruction includes:
- a second parameter extraction unit, configured to extract a vector operand address, an activation operation control code, and a post-processing operation control code from the special-type computing instruction;
- a second data reading unit, configured to read the input gate, the state gate, the forget gate, and the previous piece of state data corresponding to the vector operand address from related registers or memories;
- a fourth computing unit, configured to create a first vector corresponding to the input gate and the forget gate, and create a second vector corresponding to the state gate and the previous piece of state data, and then compute a dot product of the first vector and the second vector;
- a fifth computing unit, configured to implement an activation function corresponding to the dot product in the special-type computational process under the control of the activation operation control code, and obtain the corresponding activation function operation result; and
- a sixth computing unit, configured to implement post-processing operations corresponding to the activation function operation result in the special-type computational process under the control of the post-processing operation control code.

In some embodiments, the exponential shift instruction includes:
- a third parameter extraction unit, configured to extract a vector operand address, an activation operation control code, and a post-processing operation control code from the exponential shift instruction;
- a third data reading unit, configured to read a first vector and a second vector corresponding to the vector operand address from related registers or memories;
- a seventh computing unit, configured to perform product accumulation operation on the first vector and the second vector to obtain the corresponding product accumulation operation result;
- an eighth computing unit, configured to implement activation function corresponding to the product accumulation operation result during the shift operations under the control of the activation operation control code, and obtain the corresponding activation function operation result; and
- a ninth computing unit, configured to implement post-processing operations corresponding to the activation function operation result during the shift operations under the control of the post-processing operation control code.

In some embodiments, the data transfer instruction includes:
- an MOV instruction, used for performing first data transfer operations to implement data transfer operations between different registers during computation of the recurrent neural network;
- an LDR instruction, used for performing second data transfer operations to read data from a memory and transfer the read data to a register; and
- an SRT instruction, used for performing third data transfer operations to read data from a register and transfer the read data to a memory.

In some embodiments, the registers arranged in the hardware accelerator include:
- a vector register, configured to store vector variables;
- an address register, configured to address and compute addresses;
- a common register, configured to store instruction computing results;
- a component register, configured to provide services for half-precision floating-point operation processes, activation function computational processes, and post-processing processes to reduce pipeline waiting time; and
- a circulating register, configured to provide services for loop instructions and jump instructions.

In a second aspect, this application discloses a data processing method based on an instruction set of a recurrent neural network, including the following steps:
- controlling data at input and output ends of a computing pipeline in the recurrent neural network by executing a data flow control instruction;
- implementing general-type computation in the recurrent neural network by executing a general-type computing instruction, where an expression for the general-type computation is $\theta(w*x+b)$, $\theta$ represents a sigmoid activation function or tan h activation function, w represents a weight vector, x represents a data vector, and b represents a bias parameter;
- implementing special-type computation in the recurrent neural network by executing a special-type computing instruction, where an expression for the special-type computation is $f_t \odot c_{t-1} + i_t \odot \tilde{c}_t$ and extended operation thereof, $i_t$ represents an input gate, $\tilde{c}_t$ represents a state gate, $f_t$ represents a forget gate, $c_{t-1}$ represents the previous piece of state data, and $\odot$ represents a Hadamard product;
- implementing data normalization during computation of the recurrent neural network by executing an exponential shift instruction; and
- implementing data transfer operations between different registers as well as data transfer operations between registers and memories during computation of the recurrent neural network by executing a data transfer instruction.

In a third aspect, this application discloses a system-level chip, including the aforementioned hardware accelerator for running an instruction set of a recurrent neural network.

In a fourth aspect, this application discloses a computer-readable storage medium for storing an instruction set of a recurrent neural network that, when executed by a hardware accelerator, implements the aforementioned data processing method.

In this application, the instruction set of the recurrent neural network processed by the hardware accelerator includes a data flow control instruction, a general-type computing instruction, a special-type computing instruction, an exponential shift instruction, and a data transfer instruction, where the data flow control instruction is used for performing data flow control to control data at the input and output ends of a computing pipeline in the recurrent neural network; the general-type computing instruction is used for performing general-type computation to implement general-type computation in the recurrent neural network, where an expression for the general-type computation is θ(w*x+b), θ represents a sigmoid activation function or tan h activation function, w represents a weight vector, x represents a data vector, and b represents a bias parameter; the special-type computing instruction is used for performing special-type computation to implement special-type computation in the recurrent neural network, where an expression for the special-type computation is $f_t \odot c_{t-1} + i_t \odot \tilde{c}_t$ and extended operation thereof, $i_t$ represents an input gate, $\tilde{c}_t$ represents a state gate, $f_t$ represents a forget gate, $c_{t-1}$ represents the previous piece of state data, and $\odot$ represents a Hadamard product; the exponential shift instruction is used for performing exponential shifting to implement data normalization in computation of the recurrent neural network; and the data transfer instruction is used for performing data transfer to implement data transfer operations between different registers as well as data transfer operations between registers and memories during computation of the recurrent neural network. By means of the described technical solution, this application can effectively improve the utilization of computing resources of a hardware accelerator used for running a recurrent neural network, and can effectively avoid conflicts in data and resources.

BRIEF DESCRIPTION OF DRAWINGS

To illustrate the technical solutions in the embodiments of the present application or in the prior art more clearly, the accompanying drawings are briefly introduced below. Obviously, the accompanying drawings in the following description are only some embodiments of the present application. For those of ordinary skill in the art, other drawings may also be obtained from submitted drawings without any creative effort.

DETAILED DESCRIPTION

The technical solutions in the embodiments of the present application will be described below with reference to the accompanying drawings. It is obvious that the described embodiments are only a part of the embodiments of the present application, not all of the embodiments. Based on the embodiments of the present application, all other embodiments obtained by those of ordinary skill in the art without creative efforts shall fall within the protection scope of the present application.

Figure 1:
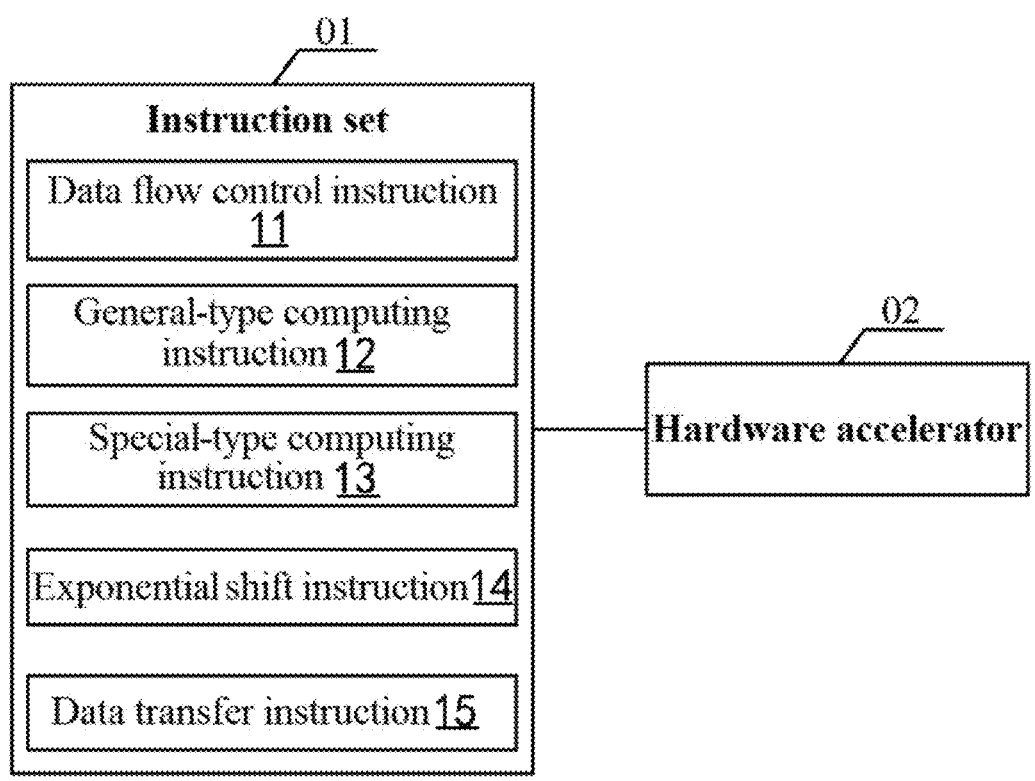
FIG. 1 is a structural diagram of a hardware accelerator disclosed in this application.

As shown in FIG. 1, some embodiments of the present application disclose a hardware accelerator 02 for running an instruction set 01 of a recurrent neural network, the hardware accelerator 02 being configured to process the instruction set 01, and the instruction set 01 including:

a data flow control instruction 11, used for performing data flow control to control data at the input and output ends of a computing pipeline in the recurrent neural network;

a general-type computing instruction 12, used for performing general-type computation to implement general-type computation in the recurrent neural network, where an expression for the general-type computation is θ(w*x+b), θ represents a sigmoid activation function or tan h activation function, w represents a weight vector, x represents a data vector, and b represents a bias parameter;

a special-type computing instruction 13, used for performing special-type computation to implement special-type computation in the recurrent neural network, where an expression for the special-type computation is $f_t \odot c_{t-1} + i_t \odot \tilde{c}_t$ and extended operation thereof, $i_t$ represents an input gate, $\tilde{c}_t$ represents a state gate, $f_t$ represents a forget gate, $c_{t-1}$ represents the previous piece of state data, and $\odot$ represents a Hadamard product;

an exponential shift instruction 14, used for performing exponential shifting to implement data normalization during computation of the recurrent neural network; and a data transfer instruction 15, used for performing data transfer to implement data transfer operations between different registers as well as data transfer operations between registers and memories during computation of the recurrent neural network.

In some embodiments, to adapt to the computational characteristics of recurrent neural networks, and to efficiently utilize the computational resources in the hardware accelerator, an instruction set 01 including at least the five types of instructions described above is accordingly proposed in some embodiments. That is, this application combines the operational characteristics of recurrent neural networks in data flow control, general-type computation, special-type computation, exponential shift, and data transfer, and accordingly proposes the above data flow control instruction 11, general-type computing instruction 12, special-type computing instruction 13, exponential shift instruction 14, and data transfer instruction 15.

The data flow control instruction 11 is used for controlling data at the input and output ends of a computing pipeline in a recurrent neural network; the general-type computing instruction 12 is used for implementing general-type computation in the recurrent neural network, where an expression for the general-type computation is θ(w*x+b), θ represents a sigmoid activation function or tan h activation function, w represents a weight vector, x represents a data vector, and b represents a bias parameter; the special-type computing instruction 13 is used for implementing special-type computation in the recurrent neural network, where an expression for the special-type computation is $f_t \odot c_{t-1} + i_t \odot \tilde{c}_t$ and extended operation thereof, $i_t$ represents an input gate, $\tilde{c}_t$ represents a state gate, $f_t$ represents a forget gate, $c_{t-1}$ represents the previous piece of state data, and $\odot$ represents a Hadamard product; the exponential shift instruction 14 is used for implementing data normalization during computation of the recurrent neural network; and the data transfer instruction 15 is used for implementing data transfer operations between different registers as well as data transfer operations between registers and memories during computation of the recurrent neural network.

Figure 2:
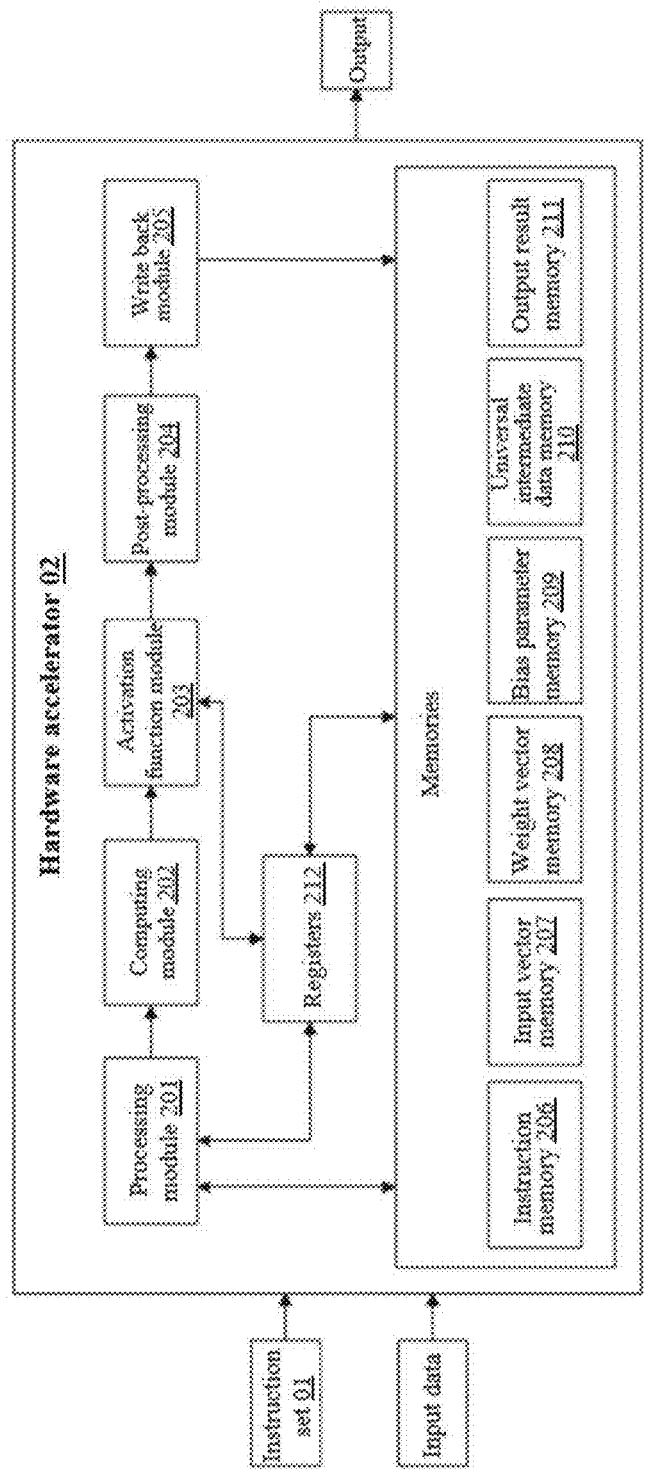
FIG. 2 is a structural diagram of a specific hardware accelerator disclosed in this application.

As shown in FIG. 2, in some embodiments, the hardware accelerator 02 may include a processing module 201, a computing module 202, an activation function module 203, a post-processing module 204, a write back module 205, and memories and registers 212. Where an input side of the hardware accelerator 02 may obtain instructions, vectors, weights, bias parameters, and the like, and place them in corresponding registers. The processing module 201 is configured to fetch instructions, decode, and obtain operands. The computing module 202 is configured to perform basic multiplication and addition operations. The activation function module 203 is configured to obtain sigmoid or tan h function values. The post-processing module 204 is configured to perform a multiplication or addition operation, fp16 data formatting, and the like. The write back module 205 is configured to cache the results to a specified location in the memories. After the computation is completed, the hardware accelerator 02 outputs the corresponding computational results through an output result memory.

In addition to an instruction memory 206 for storing instructions, the memories described above in the hardware accelerator 02 include:
- an input vector memory 207, configured to store input vectors to be computed;
- a weight vector memory 208, configured to store weight vectors of the recurrent neural network;
- a bias parameter memory 209, configured to store bias parameters of the recurrent neural network;
- a universal intermediate data memory 210, configured to store intermediate data generated during the running of the recurrent neural network; and
- an output result memory 211, configured to store output results of the recurrent neural network.

In addition, in some embodiments, the registers 212 arranged in the hardware accelerator 02 may include:
- a vector register, configured to store vector variables;
- an address register, configured to address and compute addresses;
- a common register, configured to store instruction computing results;
- a component register, configured to provide services for half-precision floating-point operation processes, activation function computational processes, and post-processing processes to reduce pipeline waiting time; and
- a circulating register, configured to provide services for loop instructions and jump instructions.

Figure 3:
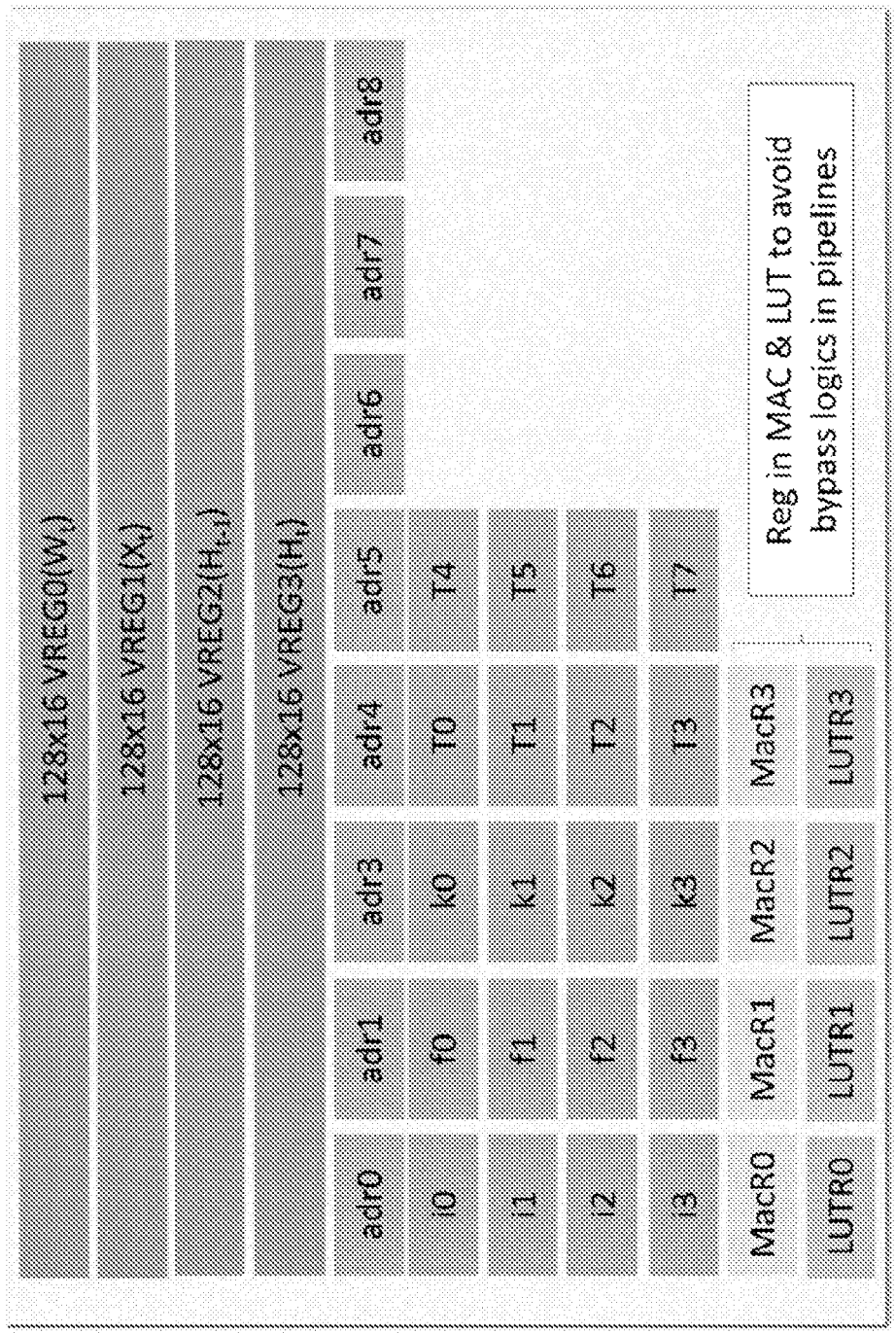
FIG. 3 is a schematic diagram of a register set disclosed in this application.

FIG. 3 shows a register set used in some embodiments of this application, where adr0, adr1 . . . are address registers; VREG0, VREG1 . . . are vector registers; i0, i1, i2, i3, f0, f1 . . . , T0, T1, T2, T3 are common registers; MacR0, MacR1 . . . LUTR0, LUTR1 are component registers. The component registers are arranged in in pipeline components, can be used during instruction execution, and are designed to reduce pipeline bubbles. The common registers are configured to store instruction computational results. The vector registers store vector variables, and the main operands in the computation of recurrent neural networks are often vector variables. Circulating registers are used for hidden use in loop instructions and jump instructions.

In addition, it should be noted that the vector registers, common registers, and component registers are all configurable in number.

Taking Long Short-Term Memory (LSTM) Networks as an example, the formation reasons of the aforementioned instruction set will be explained in detail below. In an LSTM network, the following six computations are mainly performed in one loop:

$$i_t = \sigma(W_{xi} x_t + W_{hi} h_{t-1} + b_i) \quad (1)$$

$$f_t = \sigma(W_{xf} x_t + W_{hf} h_{t-1} + b_f) \quad (2)$$

$$\tilde{c}_t = \tan h(W_{xc} x_t + W_{hc} h_{t-1} + b_c) \quad (3)$$

$$c_t = f_t \odot c_{t-1} + i_t \odot \tilde{c}_t \quad (4)$$

$$o_t = \sigma(W_{xo} x_t + W_{ho} h_{t-1} + b_o) \quad (5)$$

$$h_t = o_t \odot \tan h(c_t) \quad (6)$$

where $i_t$ represents an input gate, $\tilde{c}_t$ represents a state gate, $f_t$ represents a forget gate, $c_t$ represents state data, σ represents an activation function, $\odot$ represents a Hadamard product, $o_t$ represents an output gate, $h_t$ represents an intermediate result, $h_t$ obtained after the last computation of the loop is used as the final output of the LSTM as one of the inputs to the next loop of computation, W represents a weight, x represents a data vector, and b represents a bias parameter. The computing formulas (1), (2), (3), and (5) correspond to the general-type computing instruction 12, while the computing formulas (4) and (6) correspond to the special-type computing instruction 13. The data flow control instruction 11 is used for controlling a data flow. The exponential shift instruction 14 is used for performing exponential shifting to prevent overflow of a numerical expression field corresponding to the data format in computation, so as to achieve spatial normalization on the data. The data transfer instruction 15 is used for performing data transfer.

For the data flow control instruction 11, to implement the entire computational process, it is often necessary to monitor each intermediate computing step, controlling when to start, when to wait, or when to interrupt each step. For example, wait before the previous computation step is completed or when the data is not in place; and start after the previous computation step is completed and the data is in place. If the next computation step is started before the previous computation step is completed or when the data is not in place, an overflow error will occur; and if the next computation step is still waiting after the previous computation step is completed and the data is in place, the computational efficiency will be affected. However, monitoring every step in the process is extremely inefficient and costly. For example, when a computation step is completed, a computing unit sends a result valid signal to a control unit, and the control unit receives the result valid signal of the previous computation step, and sends an enable signal to a computing unit of the next step. It is conceivable that not only is the control logic expensive and high in power consumption, but also the increase in monitoring affects maximization of the computing efficiency. In view of this, some embodiments chooses to monitor the input and output ends of the computing pipeline instead of monitoring each intermediate computing step.

For the general-type computing instruction 12, first, the above formulas (1), (2), (3), and (5) are abstracted as:

$$\tau^j = \theta(W_x^j x_t + W_h^j h_{t-1} + b^j) \quad (7)$$

where θ represents an activation function σ or a tan h function, $\{\tau^j, W_x^j, W_h^j, b^j\}$ corresponds to $\{i_t, W_{xi}, W_{hi}, b_i\}$, $\{f_t, W_{xf}, W_{hf}, b_f\}$, $\{\tilde{c}_t, W_{xc}, W_{hc}, b_c\}$ or $\{o_t, W_{xo}, W_{ho}, b_o\}$ in the above formulas (1), (2), (3), and (5), corresponding to the j element or j row vector in a set of variables, where $\tau^j$ and $b^j$ are elements, and $W_x^j$ and $W_h^j$ are row vectors. Therefore, ⅔ of LSTM model computations are in the form of (7), which is not considered individually in conventional instruction design, or cannot be implemented with a single instruction. In this application, the general-type computing instruction 12 is designed for this computation form. Moreover, to facilitate vector operations, the number of loops of the present instruction is directly transferred in one instruction, and corresponds to the dimension of the vector. In some embodiments, 8 high bits of an instruction (i.e., 56-63 bits, in a 64-bit instruction set) are used for indicating the number of loops, so a corresponding instruction may loop up to 128 times ($=2^8$), and may support vector computations of up to 128 dimensions. In addition, a single instruction includes a flexible address post-processing command. Compared to conventional techniques that require multiple instructions to be repeatedly stacked or instructions to be nested in a loop, this application not only simplifies an instruction compiling process and improves the efficiency of instruction fetching and decoding, but also effectively reduces the space for instruction storage and reduces competition and load on computing units. In some embodiments, 0-15 low bits (16 bits in total) of a 64 bit instruction are used, each 4 bits being a segment, corresponding to an address post-processing computing mode that specifies a target operand address or three source operand addresses.

For the special-type computing instruction 13, since LSTM is a recurrent neural network, the computational process of the above formulas (1) to (6) is actually in a loop. Therefore, after corresponding instructions are designed for the formulas (1), (2), (3), and (5), in some embodiments, specific instructions are also designed for the other two high-frequency computing forms (corresponding to the formulas (4) and (6)), that is, the above special-type computing instruction 13 are obtained.

For the exponential shift instruction 14, due to the need to maintain identical distribution of data as much as possible during neural network computation, and to support the computational requirements of low bit widths such as fp16, int16, and int8, spatial normalization is often required for data. At the same time, if the specified data normalization ratio is $2^m$, here m∈Z, the normalization only operates on the exponential part of a computed binary result, which can be placed in the post-processing stage. In this way, not too much additional computing is needed, and the competition and load on computing units are reduced. Also, alignment of the subsequent pipeline cycle is ensured, and design is facilitated. Taking the fp16 data format as an example, if the data needs to be reduced by 16 times, the 3 high bits of the exponential part of a 16-bit binary number are subtracted by 1. If there is no overflow, the other bits remain unchanged, and the result of the original data reduced by 16 times is obtained.

For the data transfer instruction 15, it is well known that register access has a high speed, but a large area and limited design of number. Storage ROM access has a high latency but a large address space. One of the purposes of the data transfer instruction design is to balance use of both. In addition to the functions in an existing instruction set, the data transfer instruction also enable updating of variables during LSTM loop computation. At the same time, the data transfer instruction may also transfer immediate data to registers or memories, thereby achieving initialization of an LSTM/RNN model and sliding of an input data window.

In some embodiments, the aforementioned instructions have the advantages of efficiency, flexibility, simplicity, and the like, including:

a. Comprehensive support for vector operations: Through the use and definition of special fields, the instruction set in this application provides comprehensive support for multidimensional vector operations, not only reducing instruction storage overhead, but also providing convenience for subsequent instruction compiling applications. To facilitate vector operations, the number of loops of the present instruction is directly transferred in one instruction, and corresponds to the dimension of the vector. In some embodiments, 8 high bits of an instruction (i.e., 56-63 bits, in a 64-bit instruction set with the first bit as 0) are used for indicating the number of loops, so a corresponding instruction may loop up to 128 times ($=2^8$), and may support vector computations of up to 128 dimensions.

b. Efficient and flexible multi-in-one instruction function design: The instructions in the instruction set of this application, especially computing operation instructions, include information fields such as operation type, operand or address, post-processing of address, post-processing of computation, number of loops, and the like. Not only the instruction storage overhead is reduced, but also the efficiency of instruction compiling and decoding is improved. More importantly, through combination of instruction functions, the efficiency of pipeline parallelism is considered in advance in the design of an instruction set, the risk of performance bottlenecks or resource conflicts in subsequent instruction compiling and applications is reduced, and the operability of secondary development is improved.

c. Innovation in automatic addressing and post-processing, focusing on operation: Aiming at the characteristics of loop processes and input variables in recurrent neural network computing, a circuit implements automatic update of register addresses after address retrieval, points to the next target operand address or source operand address requested by the instruction loop, and strengthens the focus on the core tasks of a pipeline. A single instruction includes a flexible address post-processing command. Compared to conventional techniques that require multiple instructions to be repeatedly stacked or instructions to be nested in a loop, this application not only simplifies an instruction compiling process and improves the efficiency of instruction fetching and decoding, but also effectively reduces the space for instruction storage and reduces competition and load on computing units. In some embodiments, 0-15 low bits (16 bits in total) of a 64 bit instruction are used, each 4 bits being a segment, corresponding to an address post-processing computing mode that specifies a target operand address or three source operand addresses.

e. High adaptation with the computational characteristics of recurrent neural networks, and targeted utilization of computing resources: From the foregoing content, it can be seen that, in particular, the design of the general-type computing instruction 12, the special-type computing instruction 13, and the exponential shift instruction 14 enables the instruction set to highly adapt to the characteristics of LSTM model computing, refines the commonalities of core operations, and comprehensively covers all aspects of model computing. In view of practical application effects, the actual utilization of computing resources is 95% or higher, and high efficiency of a recurrent neural network computing accelerator is achieved.

As can be seen from the above, some embodiments of this application implement design of an instruction set required for a hardware accelerator dedicated to a recurrent neural network model. By only monitoring data flows at the input and output ends of a pipeline through a data flow control instruction, data flow control of the entire pipeline can be implemented, while avoiding large overhead caused by flow control and monitoring of various computing steps, and improving the computational efficiency. Computation of arithmetic expressions that are not individually considered or cannot be implemented with a single instruction in conventional instruction design can be implemented through a general-type computing instruction. Computation of expressions involved in special-type computations can be implemented through a special-type computing instruction. Normalization and data transfer can be implemented respectively through an exponential shift instruction and a data transfer instruction. The design of the above instruction set greatly improves the overall computational efficiency compared to the prior art, and also ensure low overhead and low power consumption. It can be seen that by means of the described technical solution, the embodiments of this application can effectively improve the utilization of computing resources of a hardware accelerator used for running a recurrent neural network, and can effectively avoid conflicts in data and resources.

The instruction set in the embodiments of this application will be further described below. In some embodiments, the data flow control instruction may include:

a first sub-instruction, used for performing input control to control the input to the computing pipeline in the recurrent neural network through the state of the input vector memory;

a second sub-instruction, used for performing output control to control the output from the computing pipeline in the recurrent neural network through the state of the output result memory; and a third sub-instruction, used for performing running control to control the running of the computing pipeline in the recurrent neural network.

It should be noted that in practical applications, the above operations related to input control, output control, and operation control may exist simultaneously or independently.

In some embodiments, the general-type computing instruction may include:

a first parameter extraction unit, configured to extract a vector operand address, a bias parameter address, an activation operation control code, and a post-processing operation control code from the general-type computing instruction;

a first data reading unit, configured to read the weight vector and the data vector corresponding to the vector operand address, and read the bias parameter corresponding to the bias parameter address from related registers or memories;

a first computing unit, configured to compute a dot product of the weight vector and the data vector, and add the dot product to the bias parameter to obtain a corresponding vector computing result;

a second computing unit, configured to implement an activation function corresponding to the vector computing result in the general-type computational process under the control of the activation control code, and obtain the corresponding activation function operation result; and a third computing unit, configured to implement post-processing operations corresponding to the activation function operation result in the general-type computational process under the control of the post-processing operation control code.

In some embodiments, the special-type computing instruction may include:

a second parameter extraction unit, configured to extract a vector operand address, an activation operation control code, and a post-processing operation control code from the special-type computing instruction;

a second data reading unit, configured to read the input gate, the state gate, the forget gate, and the previous piece of state data corresponding to the vector operand address from related registers or memories;

a fourth computing unit, configured to create a first vector corresponding to the input gate and the forget gate, and create a second vector corresponding to the state gate and the previous piece of state data, and then compute a dot product of the first vector and the second vector;

a fifth computing unit, configured to implement an activation function corresponding to the dot product in the special-type computational process under the control of the activation operation control code, and obtain the corresponding activation function operation result; and a sixth computing unit, configured to implement post-processing operations corresponding to the activation function operation result in the special-type computational process under the control of the post-processing operation control code.

In some embodiments, the exponential shift instruction may include:

a third parameter extraction unit, configured to extract a vector operand address, an activation operation control code, and a post-processing operation control code from the exponential shift instruction;

a third data reading unit, configured to read a first vector and a second vector corresponding to the vector operand address from related registers or memories;

a seventh computing unit, configured to perform product accumulation operation on the first vector and the second vector to obtain the corresponding product accumulation operation result;

an eighth computing unit, configured to implement an activation function corresponding to the product accumulation operation result during the shift operations under the control of the activation operation control code, and obtain the corresponding activation function operation result; and a ninth computing unit, configured to implement post-processing operations corresponding to the activation function operation result during the shift operations under the control of the post-processing operation control code.

In some embodiments, the first vector and the second vector are mostly used for input preprocessing and output postprocessing. The input preprocessing and output post-processing generally use a fully connected layer computing mode, with each computation step of the fully connected layer corresponding to an input and weight. In addition, the information read through the third data reading unit may also include bias parameters.

In some embodiments, the data transfer instruction may include:

an MOV instruction, used for performing first data transfer operations to implement data transfer operations between different registers during computation of the recurrent neural network;

an LDR instruction, used for performing second data transfer operations to read data from a memory and transfer the read data to a register; and an SRT instruction, used for performing third data transfer operations to read data from a register and transfer the read data to a memory.

It should be noted that in practical applications, the first, second and third data transfer operations may exist simultaneously or independently.

Figure 4:
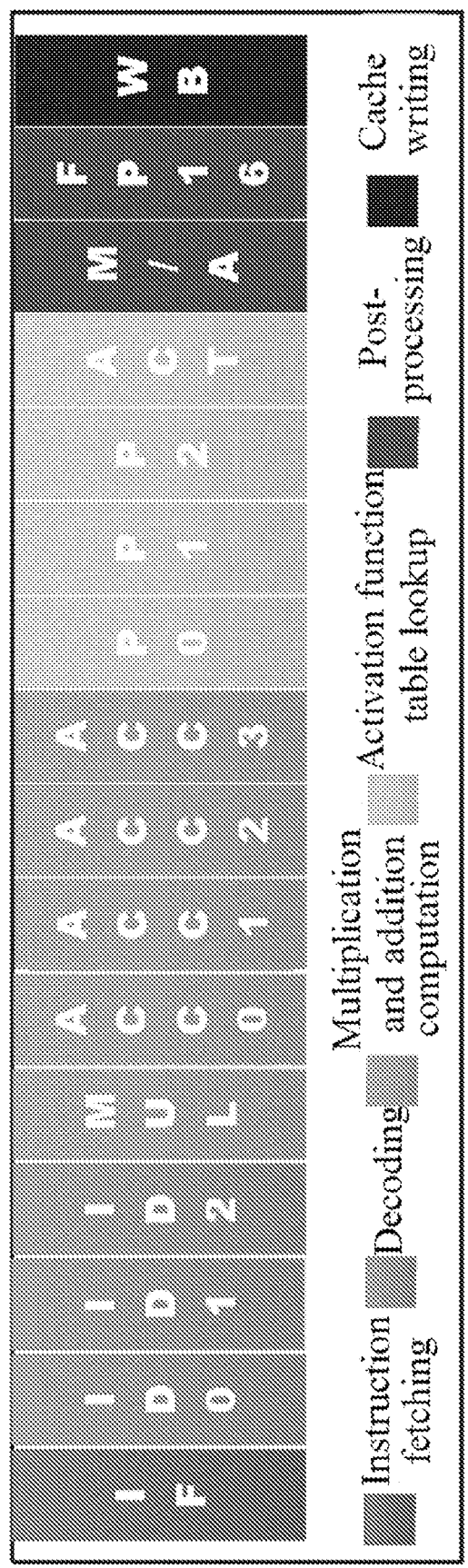
FIG. 4 is a schematic diagram of a pipeline related to the general-type computing instruction/special-type computing instruction/exponential shift instruction disclosed in this application.
Figure 5:
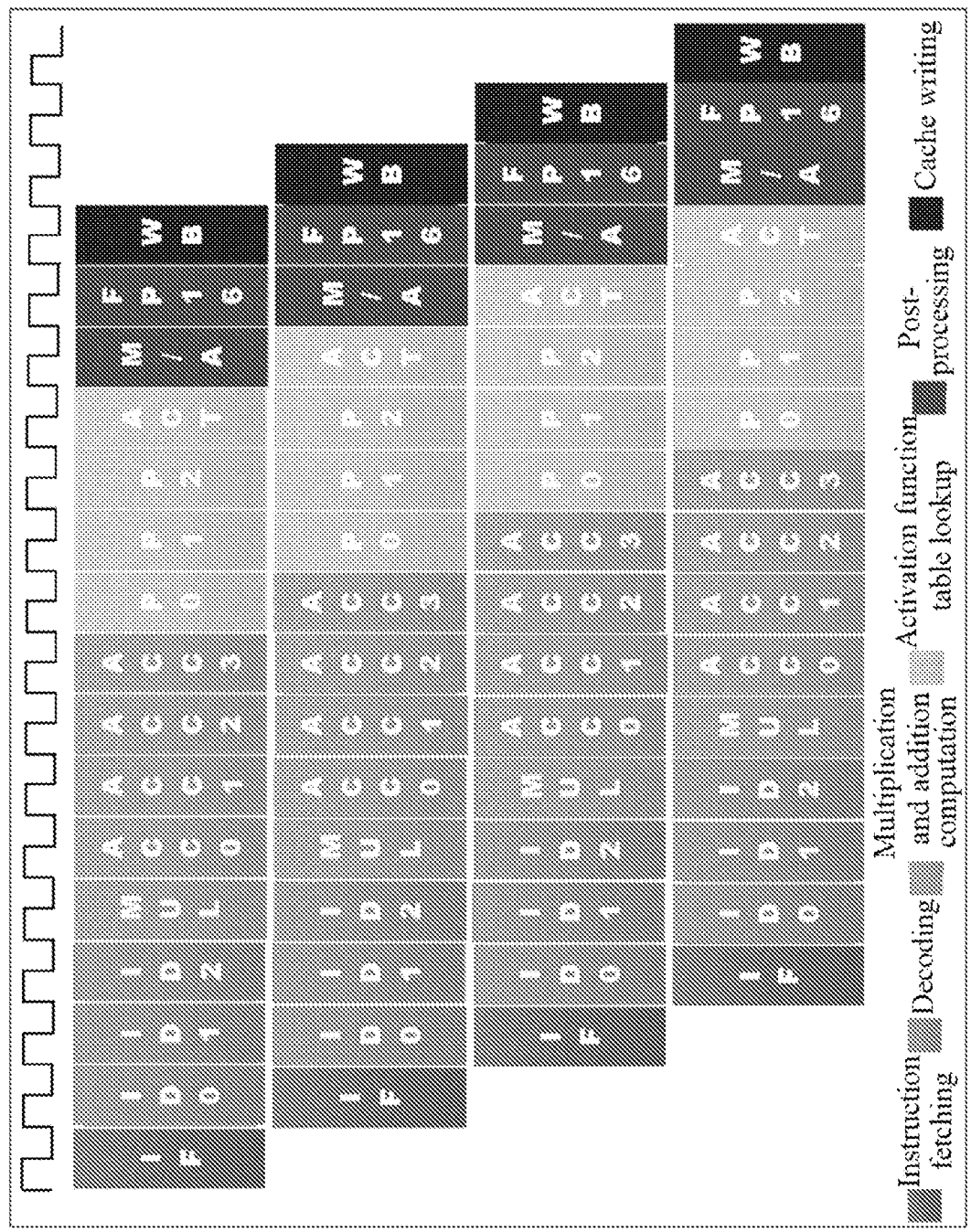
FIG. 5 is a schematic diagram of a pipeline computing cycle disclosed in this application.
Figure 6:
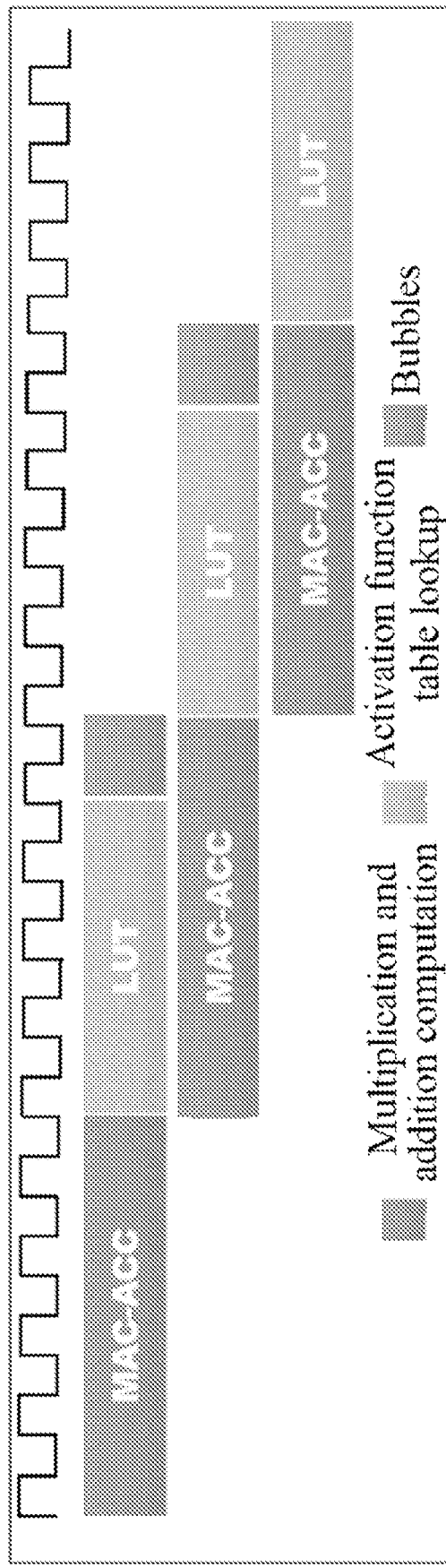
FIG. 6 is a schematic diagram of a pipeline computing cycle with bubbles disclosed in this application.

Further, some embodiments further propose a pipeline design scheme, as shown in FIGS. 4, 5, and 6. The design and implementation of the above instruction set in the embodiments can ensure that the pipeline has the following characteristics:

A. Cycle equalization: According to the principle of pipeline, it is not difficult to identify the segment with the longest execution time as the bottleneck of the entire pipeline. For example, as shown in FIG. 6, the multiplication and addition computation stage here requires 5 clock cycles, and the activation function table lookup requires 4 clock cycles. If processing is performed directly according to pipeline parallelism, the bubbles shown in the figure will occur. Therefore, in some embodiments, each stage of the processing process of each instruction is divided into one clock cycle as much as possible, especially for the computing related instructions, as shown in FIG. 4:

Instruction fetching (1 cycle);

Decoding (3 cycles): obtaining the corresponding fields of source and target operands in an instruction; in the case of direct or indirect addressing, continuing accessing the corresponding register; and in the case of indirect search, continuing to access a unit in a register or memory corresponding to the address information in the corresponding register accessed in the previous cycle;

Multiplication and addition computation (5 cycles): multiplication requiring 1 cycle; the other 4 cycles supporting a maximum of 128 linear pipeline accumulations;

Activation function table lookup (4 cycles): determining segmentation; mapping addresses; looking up a table; and computing interpolation;

Post-processing (2 cycles): optional multiplication and addition operations; and fp16 standardization;

Cache writing (1 cycle).

By the above design, a saturated pipeline computing process shown in FIG. 5 is implemented.

B. Segmental alignment: It may be noted that the computation of the formula (6) requires the results of the formula (4). Waiting for the results of the previous step may make linear pipeline parallelism unsaturated and generate bubbles. Therefore, in some embodiments, the formula (6) may be converted to obtain the formula (8):

$$h_t = o_i \odot \tan h(f_t \odot c_{t-1} + i_t \odot \tilde{c}_t) \quad (8)$$

Moreover, the operation of $\odot$ (Hadamard product) is performed at the end, corresponding to the post-processing computing stage in the pipeline, which achieves alignment and unification of various stages during pipeline processing of computing instructions. This not only avoids the above problems, but also facilitates other designs for avoiding resource competition, and the like.

C. Non-overlapping resource utilization: To ensure parallelism of a linear pipeline, occupation or overlapping of arithmetic units, memory, and registers in multiple clock cycles during one execution process of each instruction are avoided. For example, in the multiplication and addition computing stage, adders used in 4 clock cycles are different and not used cyclically, thereby avoiding generation of bubbles in the pipeline caused by inability to parallel computations at each stage.

It can be seen that, the above instruction set is combined with a computing pipeline architecture of a recurrent neural network, and algorithms for various time series networks are disassembled into different types of basic computations. Different defined instructions represent different types of basic computations. An instruction set formed by combining different instructions combines various basic computations, with the design optimization goal of maximizing computing bandwidth, thereby minimizing pipeline bubbles (i.e., hardware idle conditions that occur in the pipeline), achieving maximum pipeline execution efficiency, maximizing the utilization of hardware computing resources, and achieving recurrent neural network algorithms and meeting various requirements of algorithm changes with a small hardware overhead.

Further, some embodiments of this application disclose a data processing method based on an instruction set of a recurrent neural network, including the following steps:

controlling data at input and output ends of a computing pipeline in the recurrent neural network by executing a data flow control instruction;

implementing general-type computation in the recurrent neural network by executing a general-type computing instruction, where an expression for the general-type computation is $\theta(w^*x+b)$, $\theta$ represents a sigmoid activation function or tan h activation function, w represents a weight vector, x represents a data vector, and b represents a bias parameter;

implementing special-type computation in the recurrent neural network by executing a special-type computing instruction, where an expression for the special-type computation is $f_t \odot c_{t-1} + i_t \odot \tilde{c}_t$ and extended operation thereof, $i_t$ represents an input gate, $\tilde{c}_t$ represents a state gate, $f_t$ represents a forget gate, $c_{t-1}$ represents the previous piece of state data, and $\odot$ represents a Hadamard product;

implementing data normalization during computation of the recurrent neural network by executing an exponential shift instruction; and implementing data transfer operations between different registers as well as data transfer operations between registers and memories during computation of the recurrent neural network by executing a data transfer instruction.

Further, the controlling data at input and output ends of a computing pipeline in the recurrent neural network by executing a data flow control instruction may include: perform input control to control the input to the computing pipeline in the recurrent neural network through the state of an input vector memory; perform output control to control the output from the computing pipeline in the recurrent neural network through the state of an output result memory; and perform control on the operation of the computing pipeline in the recurrent neural network.

Figure 7:
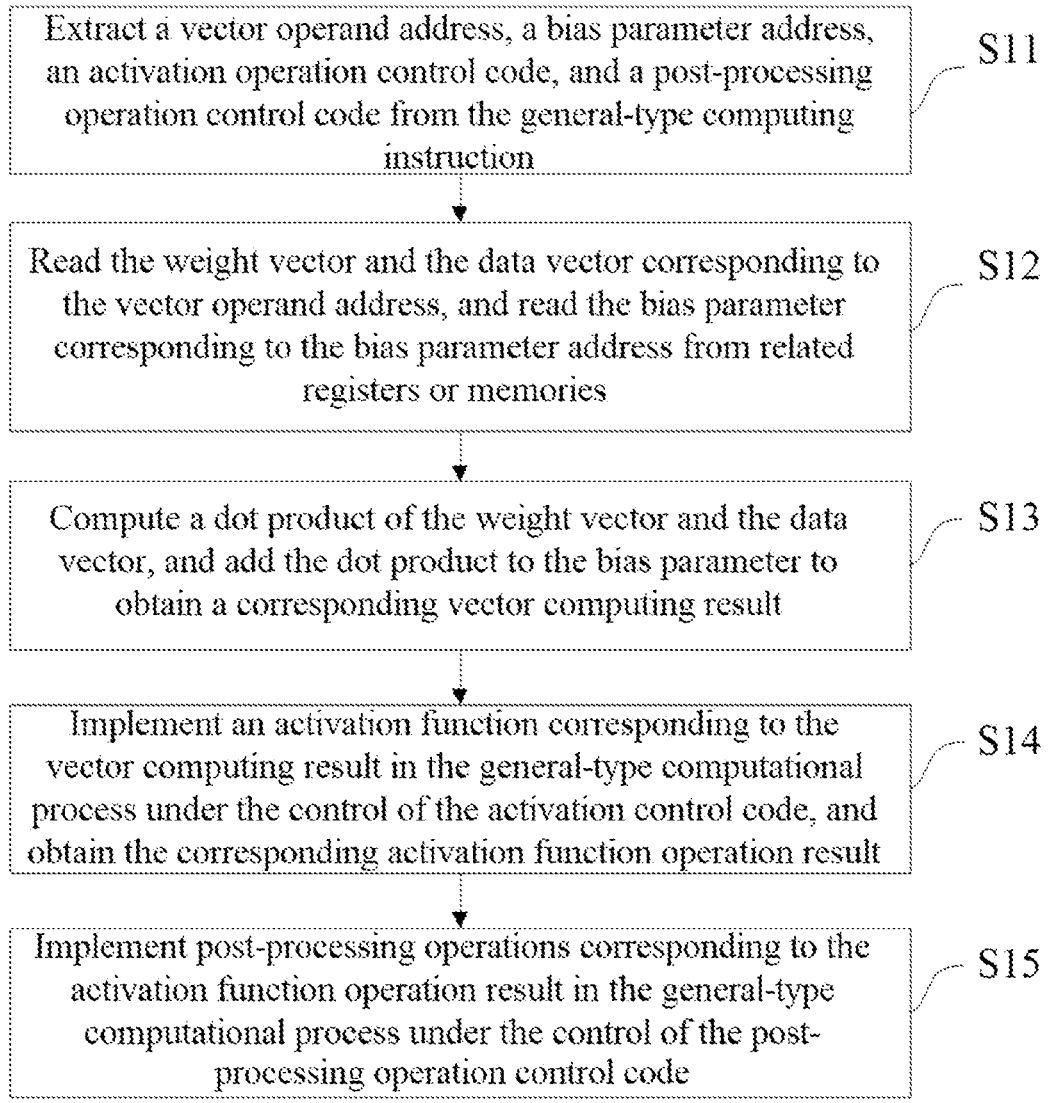
FIG. 7 is a sub-flowchart of data processing disclosed in this application.

As shown in FIG. 7, the implementing general-type computation in the recurrent neural network by executing a general-type computing instruction may include the following steps:

S11: extract a vector operand address, a bias parameter address, an activation operation control code, and a post-processing operation control code from the general-type computing instruction;

S12: read the weight vector and the data vector corresponding to the vector operand address, and read the bias parameter corresponding to the bias parameter address from related registers or memories;

S13: compute a dot product of the weight vector and the data vector, and add the dot product to the bias parameter to obtain a corresponding vector computing result;

S14: implement an activation function corresponding to the vector computing result in the general-type computational process under the control of the activation control code, and obtain the corresponding activation function operation result; and S15: implement post-processing operations corresponding to the activation function operation result in the general-type computational process under the control of the post-processing operation control code.

Figure 8:
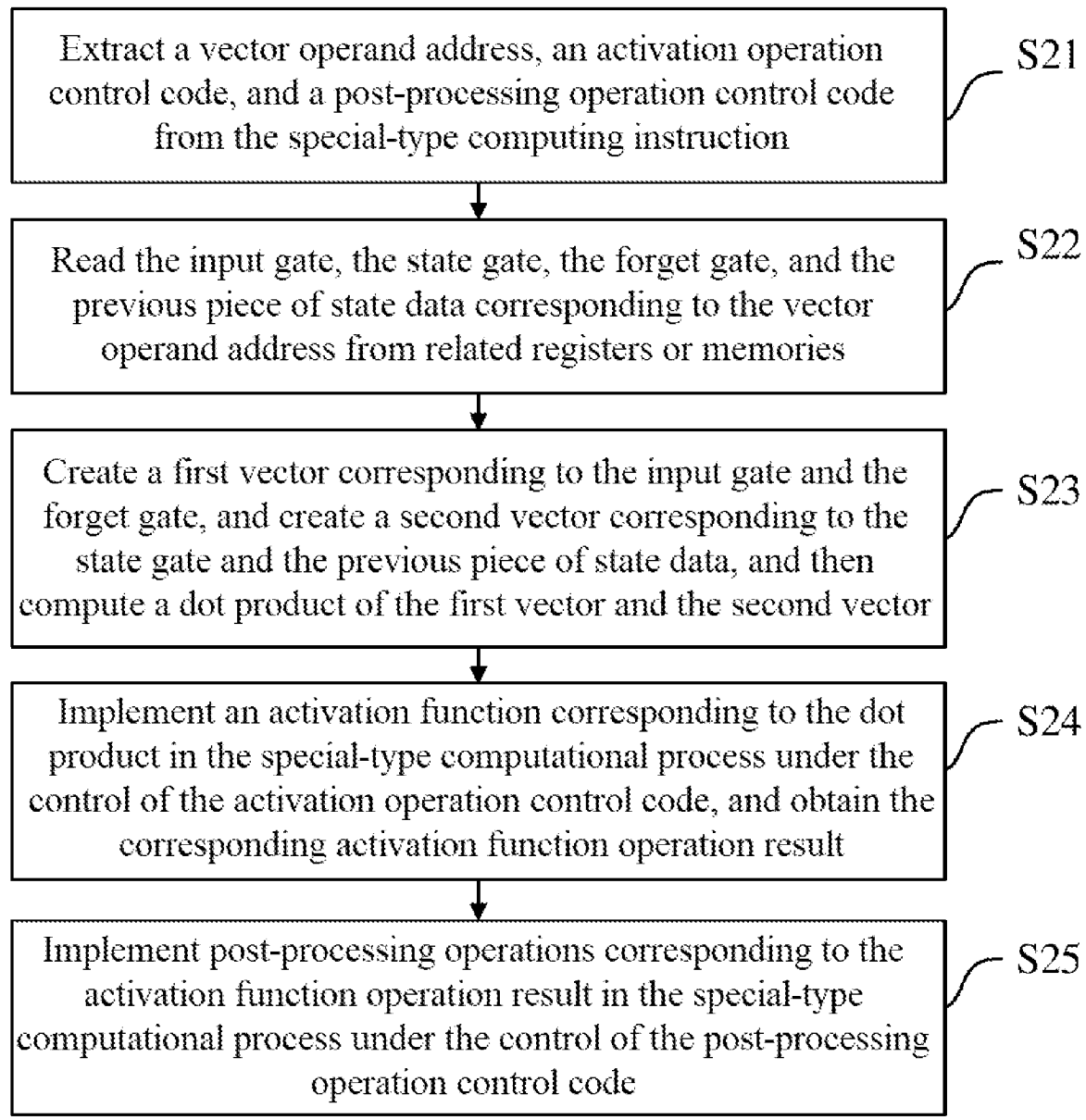
FIG. 8 is another sub-flowchart of data processing disclosed in this application.

As shown in FIG. 8, the implementing special-type computation in the recurrent neural network by executing a special-type computing instruction may include:

S21: extract a vector operand address, an activation operation control code, and a post-processing operation control code from the special-type computing instruction;

S22: read the input gate, the state gate, the forget gate, and the previous piece of state data corresponding to the vector operand address from related registers or memories;

S23: create a first vector corresponding to the input gate and the forget gate, and create a second vector corresponding to the state gate and the previous piece of state data, and then compute a dot product of the first vector and the second vector;

S24: implement an activation function corresponding to the dot product in the special-type computational process under the control of the activation operation control code, and obtain the corresponding activation function operation result; and S25: implement post-processing operations corresponding to the activation function operation result in the special-type computational process under the control of the post-processing operation control code.

Figure 9:
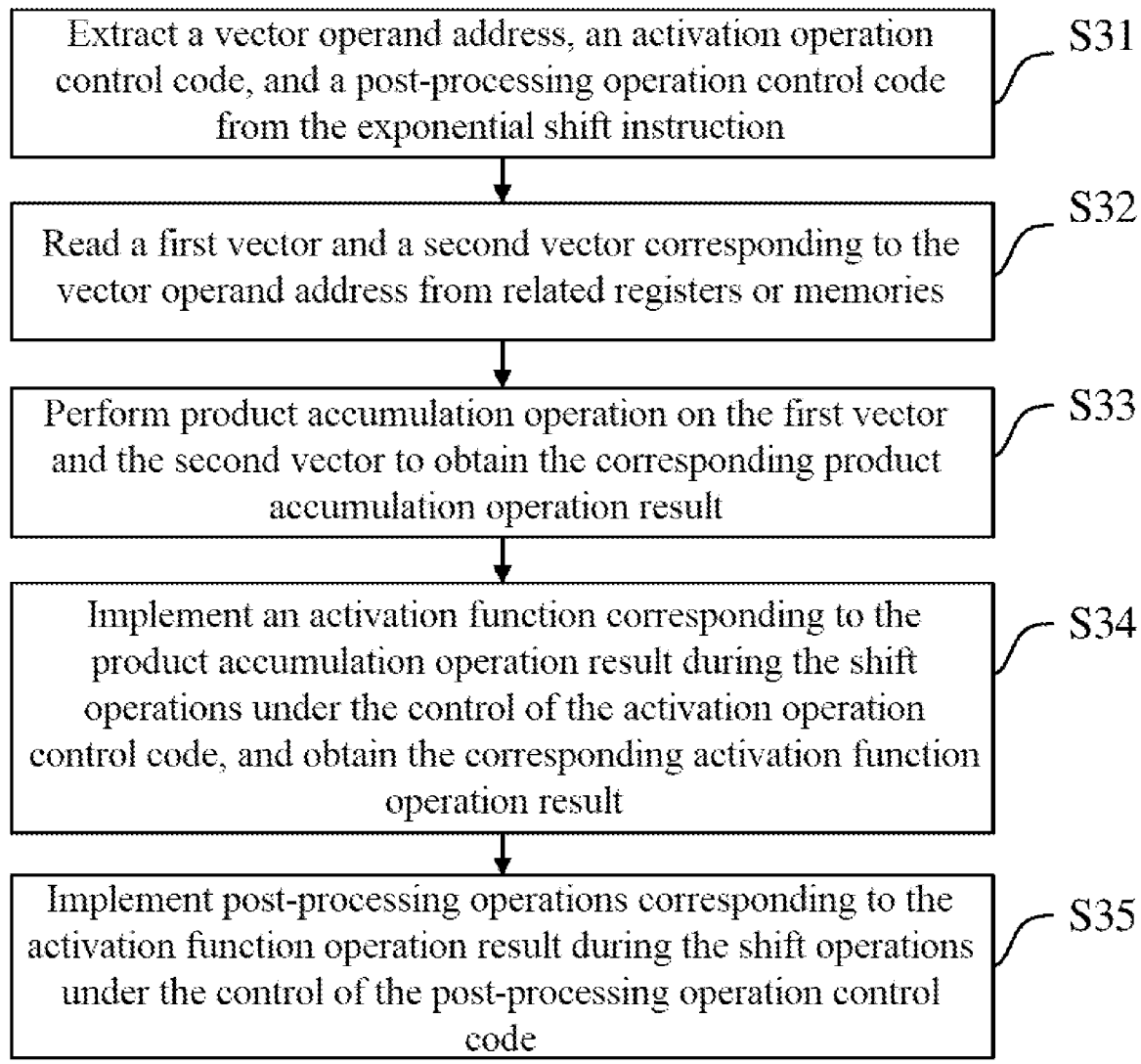
FIG. 9 is another sub-flowchart of data processing disclosed in this application.

As shown in FIG. 9, the implementing data normalization during computation of the recurrent neural network by executing an exponential shift instruction may include:

S31: extract a vector operand address, an activation operation control code, and a post-processing operation control code from the exponential shift instruction;

S32: read a first vector and a second vector corresponding to the vector operand address from related registers or memories;

S33: perform product accumulation operation on the first vector and the second vector to obtain the corresponding product accumulation operation result;

S34: implement an activation function corresponding to the product accumulation operation result during the shift operations under the control of the activation operation control code, and obtain the corresponding activation function operation result; and S35: implement post-processing operations corresponding to the activation function operation result during the shift operations under the control of the post-processing operation control code.

In addition, the implementing data transfer operations between different registers as well as data transfer operations between registers and memories during computation of the recurrent neural network by executing a data transfer instruction may include: perform first data transfer to implement data transfer between different registers during computation of the recurrent neural network; perform second data transfer to read data from a memory and transfer the read data to a register; and perform third data transfer to read data from a register and transfer the read data to a memory.

Further, this application proposes an addressing scheme suitable for recurrent neural networks, which can effectively carry out addressing processing in hardware accelerators targeting recurrent neural networks, and adapts to the computational characteristics of recurrent neural networks. The addressing scheme includes:

extract an address code and a control code of an operand from an operation instruction; determine address information of the operand based on an addressing field in the address code, where the address information includes read address information or write address information of the operand; implement relevant addressing for the current operand based on the address information, and then perform corresponding address update based on an arithmetic type provided by an arithmetic unit according to the control code and through the arithmetic unit arranged on an address register in advance.

In some embodiments, the hardware accelerator for recurrent neural networks may involve different types of operation instructions during actual operation to meet different types of computing needs. An addressing process is involved in the execution of an operation instruction, and the addressing mode corresponding to the operation instruction may be memory indirect addressing, register indirect addressing, or direct addressing. To implement addressing, in some embodiments, first the address code of the operand and the control code of the operand need to be extracted from the operation instruction. It can be understood that the operand includes a source operand and a target operand. The source operand instruction refers to the data that is requested and inputted during execution of the corresponding operation, and correspondingly, the target operand refers to the data that is generated and outputted when the instruction completes the corresponding operation. In practical applications, the operand corresponding to an operation instruction includes at least one of the aforementioned two types of operands, usually both types of operands. In addition, an addressing control process of the operand can be determined by means of the control code of the operand.

In some embodiments, the address code includes an addressing field used for characterizing the address information of the operand. The address information of the operand, including read address information or write address information of the operand, can be determined based on the addressing field.

It can be understood that after the address information of the operand is obtained, relevant addressing for the current operand may be implemented based on the address information, and then the address may be updated based on the control code of the operand and through an arithmetic unit arranged on the address register in advance. The address update scheme in the addressing process of some embodiments of this application does not occupy MAC computing resources in a hardware acceleration module in the addressing process, solves the problems of computing resource shortage and computing resource conflict by an arithmetic unit arranged on an address register in advance, effectively reduces the storage of instructions, and improves the addressing efficiency.

Further, some embodiments of this application disclose a system-level chip, including the aforementioned hardware accelerator for running an instruction set of a recurrent neural network. The specific structure and working process of the hardware accelerator are described in the corresponding content disclosed in the aforementioned embodiment, and will not be described in detail here.

Further, some embodiments of this application disclose a computer-readable storage medium for storing an instruction set of a recurrent neural network that, when executed by a hardware accelerator, implements the data processing method disclosed in the aforementioned embodiments. The specific process of the data processing method is described in the corresponding content, and will not be described in detail here.

Finally, it should be noted that in this application, relational terms such as first and second are only used for distinguishing one entity or operation from another entity or operation, and do not necessarily require or imply any such actual relationship or order between these entities or operations. Moreover, the terms "include," "comprise," or any other variation thereof are intended to cover nonexclusive inclusion, such that a process, method, article, or device that includes a series of elements includes not only those elements, but also other elements that are not explicitly listed, or also elements inherent in such a process, method, article, or device. Without further limitations, the elements defined by the statement "including a . . . " do not exclude the existence of other identical elements in the process, method, article, or device that includes the elements.

The above describes in detail a hardware accelerator, a data processing method, a system-level chip, and a medium provided by the present application. In this application, specific examples are used for illustrating the principle and implementation of the application. The description of the above embodiments is only to help understand the method and core ideas of the application. At the same time, for those skilled in the art, there may be changes in the specific implementations based on the idea of the application. In summary, the content of this description should not be understood as a limitation of the application.

The invention claimed is:

1. A hardware accelerator for running an instruction set of a recurrent neural network, wherein:
the hardware accelerator comprises a plurality of modules that comprises a processing module, a computing module, an activation function module, a post-processing module, and a write back module in a serial connection, memories connected with the processing module and the write back module, and registers connected with the memories and the activation function module; and
the plurality of modules, in collaboration with the registers and memories, is configured to process the instruction set of the recurrent neural network to perform computations that are converted into:
a general-type computation with an expression of a linear transformation followed by a sigmoid activation function or a tanh activation function; and
a special-type computation with an expression of a cell state update function that comprises a Hadamard product,
wherein:
the processing module is configured to fetch the instruction set during a first time, and the instruction set comprises:
a data flow control instruction, configured for performing data flow control to control data at an input end and an output end of a computing pipeline in the recurrent neural network, the computing pipeline comprising a plurality of stages, and each stage being executed by one of the plurality of modules in series;
a general-type computing instruction, configured for performing the general-type computation to implement the general-type computation in the recurrent neural network;
a special-type computing instruction, configured for performing the special-type computation to implement the special-type computation in the recurrent neural network;
an exponential shift instruction, configured for performing exponential shifting to implement data normalization during the computation of the recurrent neural network; and
a data transfer instruction, configured for performing data transfer to implement data transfer operations between the registers as well as data transfer operations between the registers and memories during the computation of the recurrent neural network;
the processing module is configured to obtain operands from the registers and memories and feed the operands into the computing module, during a second time, and the computing module is configured to perform, during a third time, dot product and addition based on the operands and the general-type computing instruction;
the activation function module is configured to obtain a value of the sigmoid activation function or a value of the tanh activation function based on the general-type computing instruction and feed the value of the sigmoid activation function or the value of the tanh activation function into the post-processing module, during a fourth time, and during a fifth time, the post-processing module is configured to perform operations comprising the Hadamard product based on the special-type computation instruction and data formatting;
the write back module is configured to cache, during a sixth time, a computation result from the post-processing module in the memories; and the first, second, third, fourth, fifth, and sixth times are each based on one or more clock cycles and occur consecutively.

2. The hardware accelerator according to claim 1, wherein the memories in the hardware accelerator comprise:
   an input vector memory, configured to store input vectors to be computed;
   a weight vector memory, configured to store weight vectors of the recurrent neural network;
   a bias parameter memory, configured to store bias parameters of the recurrent neural network;
   a universal intermediate data memory, configured to store intermediate data generated during the running of the recurrent neural network; and
   an output result memory, configured to store output results of the recurrent neural network.

3. The hardware accelerator according to claim 2, wherein the data flow control instruction comprises:
   a first sub-instruction, configured for performing input control to control an input to the computing pipeline in the recurrent neural network through a state of the input vector memory;
   a second sub-instruction, configured for performing output control to control an output from the computing pipeline in the recurrent neural network through a state of the output result memory; and
   a third sub-instruction, configured for performing running control to control execution of the computing pipeline in the recurrent neural network.

4. The hardware accelerator according to claim 1, wherein the general-type computing instruction comprises:
   a fourth sub-instruction, configured to extract a vector operand address, a bias parameter address, an activation operation control code, and a post-processing operation control code from the general-type computing instruction;
   a fifth sub-instruction, configured to read the weight vector and the data vector corresponding to the vector operand address, and read the bias parameter corresponding to the bias parameter address from the registers or memories;
   a sixth sub-instruction, configured to compute a dot product of the weight vector and the data vector, and add the dot product to the bias parameter to obtain a corresponding vector computing result;
   a seventh sub-instruction, configured to implement an activation function corresponding to the vector computing result in the general-type computation under control of an activation control code, and obtain a corresponding activation function operation result; and
   an eighth sub-instruction, configured to implement post-processing operations corresponding to the activation function operation result in the general-type computation under the control of the post-processing operation control code.

5. The hardware accelerator according to claim 1, wherein the special-type computing instruction comprises:
   a ninth sub-instruction, configured to extract a vector operand address, an activation operation control code, and a post-processing operation control code from the special-type computing instruction;
   a tenth sub-instruction, configured to read the input gate, the state gate, the forget gate, and the previous piece of state data corresponding to the vector operand address from the registers or memories;
   an eleventh sub-instruction, configured to create a first vector corresponding to the input gate and the forget gate, create a second vector corresponding to the state gate and previous piece of state data, and compute a dot product of the first vector and the second vector;
   a twelfth sub-instruction, configured to implement an activation function corresponding to the dot product in the special-type computation under control of the activation operation control code, and obtain a corresponding activation function operation result; and
   a thirteenth sub-instruction, configured to implement post-processing operations corresponding to the activation function operation result in the special-type computation under the control of the post-processing operation control code.

6. The hardware accelerator according to claim 1, wherein the exponential shift instruction comprises:
   a fourteenth sub-instruction, configured to extract a vector operand address, an activation operation control code, and a post-processing operation control code from the exponential shift instruction;
   a fifteenth sub-instruction, configured to read a first vector and a second vector corresponding to the vector operand address from the registers or memories;
   a sixteenth sub-instruction, configured to perform product accumulation operation on the first vector and the second vector to obtain a corresponding product accumulation operation result;
   a seventeenth sub-instruction, configured to implement an activation function corresponding to the product accumulation operation result during shift operations under control of the activation operation control code, and obtain a corresponding activation function operation result; and
   an eighteenth sub-instruction, configured to implement post-processing operations corresponding to the activation function operation result during shift operations under the control of the post-processing operation control code.

7. The hardware accelerator according to claim 1, wherein the data transfer instruction comprises:
   an MOV instruction, configured for performing first data transfer operations to implement data transfer operations between the registers during the computation of the recurrent neural network;
   an LDR instruction, configured for performing second data transfer operations to read data from a first memory of the memories and transfer the read data to a first register of the registers; and
   an SRT instruction, configured for performing third data transfer operations to read data from a second register of the registers and transfer the read data to a second memory of the memories.

8. The hardware accelerator according to claim 1, wherein the registers in the hardware accelerator comprise:
   a vector register, configured to store vector variables;
   an address register, configured to address and compute addresses;
   a common register, configured to store instruction computing results;
   a component register, configured to provide services for half-precision floating-point operation processes, activation function computational processes, and post-processing processes to reduce pipeline waiting time; and
   a circulating register, configured to provide services for loop instructions and jump instructions.

9. A data processing method implemented in a hardware accelerator based on an instruction set of a recurrent neural network, wherein:

the hardware accelerator comprises a plurality of modules that comprises a processing module, a computing module, an activation function module, a post-processing module, and a write back module in a serial connection, memories connected with the processing module and the write back module, and registers connected with the memories and the activation function module, the plurality of modules, in collaboration with the registers and memories, being configured to process the instruction set of the recurrent neural network to perform computations that are converted into:

a general-type computation with an expression of a linear transformation followed by a sigmoid activation function or a tanh activation function; and a special-type computation with an expression of a cell state update function that comprises a Hadamard product;

the method comprising:

controlling data at input and output ends, through the processing module and the write back module, of a computing pipeline in the recurrent neural network by executing a data flow control instruction;

implementing the general-type computation, through the computing module and the activation function module, in the recurrent neural network by executing a general-type computing instruction;

implementing the special-type computation, through the post-processing module, in the recurrent neural network by executing a special-type computing instruction;

implementing data normalization during the computation of the recurrent neural network by executing an exponential shift instruction; and implementing data transfer operations between the registers as well as data transfer operations between the registers and memories during the computation of the recurrent neural network by executing a data transfer instruction, wherein:

the instruction set comprises the data flow control instruction, the general-type computing instruction, the special-type computing instruction, the exponential shift instruction, and the data transfer instruction;

the processing module is configured to obtain operands from the registers and memories and feed the operands into the computing module, during a second time, and the computing module is configured to perform, during a third time, dot product and addition based on the operands and the general-type computing instruction;

the activation function module is configured to obtain a value of the sigmoid activation function or a value of the tanh activation function based on the general-type computing instruction and feed the value of the sigmoid activation function or the value of the tanh activation function into the post-processing module, during a fourth time, and during a fifth time, the post-processing module is configured to perform operations comprising the Hadamard product based on the special-type computation instruction and data formatting;

the write back module is configured to cache, during a sixth time, a computation result from the post-processing module in the memories; and the first, second, third, fourth, fifth, and sixth times are each based on one or more clock cycles and occur consecutively.

10. The data processing method according to claim 9, further comprising:

storing input vectors to be computed in an input vector memory of the memories;

storing weight vectors of the recurrent neural network in a weight vector memory of the memories;

storing bias parameters of the recurrent neural network in a bias parameter memory of the memories;

storing intermediate data generated during running the recurrent neural network in a universal intermediate data memory of the memories; and storing output results of the recurrent neural network in an output result memory of the memories.

11. The data processing method according to claim 10, wherein executing the data flow control instruction comprises:

performing input control to control an input to the computing pipeline in the recurrent neural network through a state of the input vector memory;

performing output control to control an output from the computing pipeline in the recurrent neural network through a state of the output result memory; and performing running control to control execution of the computing pipeline in the recurrent neural network.

12. The data processing method according to claim 9, wherein executing the general-type computing instruction comprises:

extracting a vector operand address, a bias parameter address, an activation operation control code, and a post-processing operation control code from the general-type computing instruction;

reading the weight vector and the data vector corresponding to the vector operand address, and reading the bias parameter corresponding to the bias parameter address from the registers or memories;

computing a dot product of the weight vector and the data vector, and adding the dot product to the bias parameter to obtain a corresponding vector computing result;

implementing an activation function corresponding to the vector computing result in the general-type computation under control of an activation control code, and obtaining a corresponding activation function operation result; and implementing post-processing operations corresponding to the activation function operation result in the general-type computation under control of the post-processing operation control code.

13. The data processing method according to claim 9, wherein executing the special-type computing instruction comprises:

extracting a vector operand address, an activation operation control code, and a post-processing operation control code from the special-type computing instruction;

reading the input gate, the state gate, the forget gate, and the previous piece of state data corresponding to the vector operand address from the registers or memories;

creating a first vector corresponding to the input gate and the forget gate, creating a second vector corresponding to the state gate and previous piece of state data, and computing a dot product of the first vector and the second vector;

implementing an activation function corresponding to the dot product in the special-type computation under control of the activation operation control code, and obtaining a corresponding activation function operation result; and implementing post-processing operations corresponding to the activation function operation result in the special-type computation under control of the post-processing operation control code.

14. The data processing method according to claim 9, wherein executing the exponential shift instruction comprises:

extracting a vector operand address, an activation operation control code, and a post-processing operation control code from the exponential shift instruction;

reading a first vector and a second vector corresponding to the vector operand address from the registers or memories;

performing product accumulation operation on the first vector and the second vector to obtain a corresponding product accumulation operation result;

implementing an activation function corresponding to the product accumulation operation result during shift operations under control of the activation operation control code, and obtaining a corresponding activation function operation result; and implementing post-processing operations corresponding to the activation function operation result during shift operations under control of the post-processing operation control code.

15. The data processing method according to claim 9, wherein executing the data transfer instruction comprises:

performing first data transfer operations to implement data transfer operations between the registers during the computation of the recurrent neural network;

performing second data transfer operations to read data from a first memory of the memories and transfer the read data to a first register of the registers; and performing third data transfer operations to read data from a second register of the registers and transfer the read data to a second memory of the memories.

16. The data processing method according to claim 9, further comprising:

storing vector variables in a vector register of the registers;

addressing and computing addresses in an address register of the registers;

storing instruction computing results in a common register of the registers;

providing services in a component register of the registers, including services for half-precision floating-point operation processes, activation function computational processes, and post-processing processes to reduce pipeline waiting time; and providing services for loop instructions and jump instructions in a circulating register of the registers.

17. A system-level chip, comprising a hardware accelerator for running an instruction set of a recurrent neural network, wherein:

the hardware accelerator comprises a plurality of modules that comprises a processing module, a computing module, an activation function module, a post-processing module, and a write back module in a serial connection, memories connected with the processing module and the write back module, and registers connected with the memories and the activation function module; and the plurality of modules, in collaboration with the registers and memories, is configured to process the instruction set of the recurrent neural network to perform computations that are converted into:

a general-type computation with an expression of a linear transformation followed by a sigmoid activation function or a tanh activation function; and a special-type computation with an expression of a cell state update function that comprises a Hadamard product, wherein:

the processing module is configured to fetch the instruction set during a first time, and the instruction set comprises:

a data flow control instruction, configured for performing data flow control to control data at an input end and an output end of a computing pipeline in the recurrent neural network, the computing pipeline comprising a plurality of stages, and each stage being executed by one of the plurality of modules in series;

a general-type computing instruction, configured for performing the general-type computation to implement the general-type computation in the recurrent neural network;

a special-type computing instruction, configured for performing the special-type computation to implement the special-type computation in the recurrent neural network;

an exponential shift instruction, configured for performing exponential shifting to implement data normalization during the computation of the recurrent neural network; and a data transfer instruction, configured for performing data transfer to implement data transfer operations between the registers as well as data transfer operations between the registers and memories during the computation of the recurrent neural network;

the processing module is configured to obtain operands from the registers and memories and feed the operands into the computing module, during a second time, and the computing module is configured to perform, during a third time, dot product and addition based on the operands and the general-type computing instruction;

the activation function module is configured to obtain a value of the sigmoid activation function or a value of the tanh activation function based on the general-type computing instruction and feed the value of the sigmoid activation function or the value of the tanh activation function into the post-processing module, during a fourth time, and during a fifth time, the post-processing module is configured to perform operations comprising the Hadamard product based on the special-type computation instruction and data formatting;

the write back module is configured to cache, during a sixth time, a computation result from the post-processing module in the memories; and the first, second, third, fourth, fifth, and sixth times are each based on one or more clock cycles and occur consecutively.

18. The system-level chip according to claim 17, wherein the memories in the hardware accelerator comprise:

an input vector memory, configured to store input vectors to be computed;

a weight vector memory, configured to store weight vectors of the recurrent neural network;

a bias parameter memory, configured to store bias parameters of the recurrent neural network;

a universal intermediate data memory, configured to store intermediate data generated during execution of the recurrent neural network; and an output result memory, configured to store output results of the recurrent neural network.

19. The system-level chip according to claim 18, wherein the data flow control instruction comprises:

a first sub-instruction, configured for performing input control to control an input to the computing pipeline in the recurrent neural network through a state of the input vector memory;

a second sub-instruction, configured for performing output control to control an output from the computing pipeline in the recurrent neural network through a state of the output result memory; and a third sub-instruction, configured for performing running control to control execution of the computing pipeline in the recurrent neural network.

20. The system-level chip according to claim 17, wherein the general-type computing instruction comprises:

a fourth sub-instruction, configured to extract a vector operand address, a bias parameter address, an activation operation control code, and a post-processing operation control code from the general-type computing instruction;

a fifth sub-instruction, configured to read the weight vector and the data vector corresponding to the vector operand address, and read the bias parameter corresponding to the bias parameter address from the registers or memories;

a sixth sub-instruction, configured to compute a dot product of the weight vector and the data vector, and add the dot product to the bias parameter to obtain a corresponding vector computing result;

a seventh sub-instruction, configured to implement an activation function corresponding to the vector computing result in the general-type computation under control of an activation control code, and obtain a corresponding activation function operation result; and an eighth sub-instruction, configured to implement post-processing operations corresponding to the activation function operation result in the general-type computation under control of the post-processing operation control code.

* * * * *